United States Patent [19]
McCarville et al.

[11] Patent Number: 6,091,444
[45] Date of Patent: Jul. 18, 2000

[54] MELT VIEW CAMERA

[75] Inventors: Thomas J. McCarville, Tracy; Christopher M. Nelson, Livermore; Henry Atiles, Loomis, all of Calif.

[73] Assignee: United States Enrichment Corporation, Bethesda, Md.

[21] Appl. No.: 08/977,838

[22] Filed: Nov. 25, 1997

[51] Int. Cl.$^7$ ............................................... H04N 7/18
[52] U.S. Cl. ............................................. 348/82; 348/83
[58] Field of Search ............... 348/82, 83; 382/145; H04N 7/18

[56] References Cited

U.S. PATENT DOCUMENTS

| | | | |
|---|---|---|---|
| 4,432,286 | 2/1984 | Witte | 358/100 |
| 4,726,660 | 2/1988 | Rushford | 350/347 E |
| 4,969,035 | 11/1990 | Dawson | 358/100 |
| 5,715,328 | 2/1998 | Tsukihara | 348/83 |
| 5,922,127 | 7/1999 | Luter et al. | 117/217 |

*Primary Examiner*—Vu Le
*Assistant Examiner*—Luanne Din
*Attorney, Agent, or Firm*—David G. Beck; Townsend and Townsend and Crew, LLP

[57] ABSTRACT

A method and apparatus for continuously monitoring a melt surface is provided. The camera includes a CCD detector array, electronic shutter, and associated optical train mounted within a water cooled enclosure, all mounted within close proximity to the melt. Radiation shields surround the enclosure in order to attenuate the heat radiated from the melt to manageable levels. To minimize damage to the electro-optical components of the camera due to melt vapors and other contaminants, the camera enclosure includes a small viewing pinhole through which an inert gas is directed. The pinhole is small enough to minimize the gas flow rate while avoiding noticeable image diffraction. The small pinhole also provides a large depth of field, rendering high quality images of the melt. A compound lens system focuses the image into the CCD array to produce a near diffraction limited image over the angles of interest. The lens system contains a ninety degree turning element to protect the CCD array from direct exposure to x-rays produced at the melt surface. The electronic shutter, in combination with the pinhole, is used to reduce the incident intensity and to prevent CCD saturation during normal use. The shutter speed may be sufficiently lowered to allow alignment in ambient light. A neutral density filter may also be used in combination with the electronic shutter to avoid saturation.

18 Claims, 6 Drawing Sheets

MELT VIEW CAMERA

FIELD OF THE INVENTION

The present invention relates generally to cameras and, more particularly, to a method and apparatus for viewing a melt surface while protecting the electro-optical components of the camera from metal vapors, extreme temperatures and x-rays produced by the melt.

BACKGROUND OF THE INVENTION

It is often desirable to directly observe the surface of a high temperature melt. Such observation allows the user to optimize the various operating conditions associated with the melt. For example, by observing the melt surface the furnace temperature as well as the feed rates of the stock materials may be adjusted to optimize the melt rate. In furnaces using directed heat sources such as electron beam guns, the ability to observe the melt allows the user to control the operation of the electron guns, including the point of impact of the heat source. In addition, it is typically necessary to continuously view the melt surface during high rate vaporization of metal alloys in order to control the resultant vapor properties.

The observation of a high temperature melt is difficult for a variety of reasons. First, the temperature associated with the melt precludes the use of most common observation techniques since the high temperature rapidly damages electronics and optics alike. Furthermore, the temperature is typically high enough that connections to remote electronics become difficult due to the temperature effects on cables, interconnects, etc. Second, the dynamic range presented by a high temperature melt is typically greater than $10^4$, a range that exceeds the dynamic range of a charge coupled device (CCD) by about a decade. Third, at a high vapor rate condensing vapor can quickly obscure the viewing optics. Fourth, many of the materials of interest are corrosive. Fifth, there is typically very little space for mounting a viewing camera near the melt. Lastly, for many applications the viewing device must be mounted very near to the melt. Unfortunately, proximity to the melt further exacerbates all of the above constraints.

A number of different approaches have been taken to overcoming the problems associated with viewing a high temperature body exhibiting a wide range of temperatures and a correspondingly large light intensity range. Given that most recording equipment has a dynamic range of two to three orders of magnitude, typically it is necessary to compress the light intensity range to an acceptable level. A common approach is to electronically compress the intensity range. In this approach a detector detects the incoming light and outputs an electrical signal corresponding to the detected light intensity. The electrical signals output by the detector are then compressed and transformed into a format viewable and/or recordable by the user.

U.S. Pat. No. 4,726,660 discloses an optical approach to compressing a light intensity range. The disclosed compression technique utilizes a cholesteric liquid crystal notch filter that is configured to pass light at all wavelengths except for a relatively narrow wavelength band defining the filter's notch. The notch associated with this filter varies to a limited extent with the intensity of the incident light. The notch filter is used in combination with an interference filter to compress light intensity ranges.

A camera that can be used in a high temperature, corrosive environment to view a high temperature melt emitting radiation over a large dynamic range is therefore desired.

SUMMARY OF THE INVENTION

The present invention provides a camera capable of continuously monitoring a melt surface, for example in an electron beam vaporization scheme. The camera of the invention resides within the chamber enclosing the melt and protects the electro-optical components of the camera from corrosive vapors, extreme temperatures, and x-rays produced by the melt.

The invention utilizes a CCD detector array with an electronic shutter.

Miniaturized CCD detector arrays are commercially available and typically allow the CCD and drive electronics to be separate from the camera control unit, thus allowing the camera control unit to be located outside of the crucible chamber. The electronic shutter is used to reduce the incident intensity and to prevent CCD saturation during normal use. In some embodiments a neutral density filter is used in conjunction with the electronic shutter to avoid saturation. If a neutral density filter is required, preferably it is weak enough to permit ambient light alignment while being strong enough to avoid blooming. An optical train, preferably comprised of a chromatically corrected doublet pair, images the melt onto the CCD array. The optical train preferably includes a ninety degree mirror to protect the CCD array from direct exposure to the x-rays produced at the melt.

In the preferred embodiment of the invention, the camera includes a 1 millimeter diameter pinhole. This diameter is large enough to allow the desired field of view and to avoid noticeable diffraction effects while being small enough to provide adequate protection of the optical elements and the CCD array. The small pinhole diameter also helps to provide a large depth of field and a large depth of focus. An inert gas, preferably argon, is forced through the pinhole thereby helping to minimize melt vapors or other contaminants from damaging the electro-optical components. By utilizing a small pinhole, the gas flow can be minimized thus reducing any adverse effects the gas may have on the melt vapor.

The invention includes a water cooled camera enclosure as well as a water cooled camera support member which allows the camera to be positioned for optimum viewing. The water flows through a pair of water passages, an inlet passage and a return passage, both contained within an inner conduit. The inner conduit is preferably formed of a copper nickel composite that is surrounded by a multi-layered heat shield. The heat shield attenuates the heat radiated by the melt to manageable levels and, in the preferred embodiment, is comprised of niobium. The inner conduit also contains a passage for the flow of the purge gas. The electrical cables which couples the CCD array to the camera control unit are contained within the gas passage.

A further understanding of the nature and advantages of the present invention may be realized by reference to the remaining portions of the specification and the drawings.

DETAILED DESCRIPTION OF THE INVENTION

Dynamic Range

Figure 1:
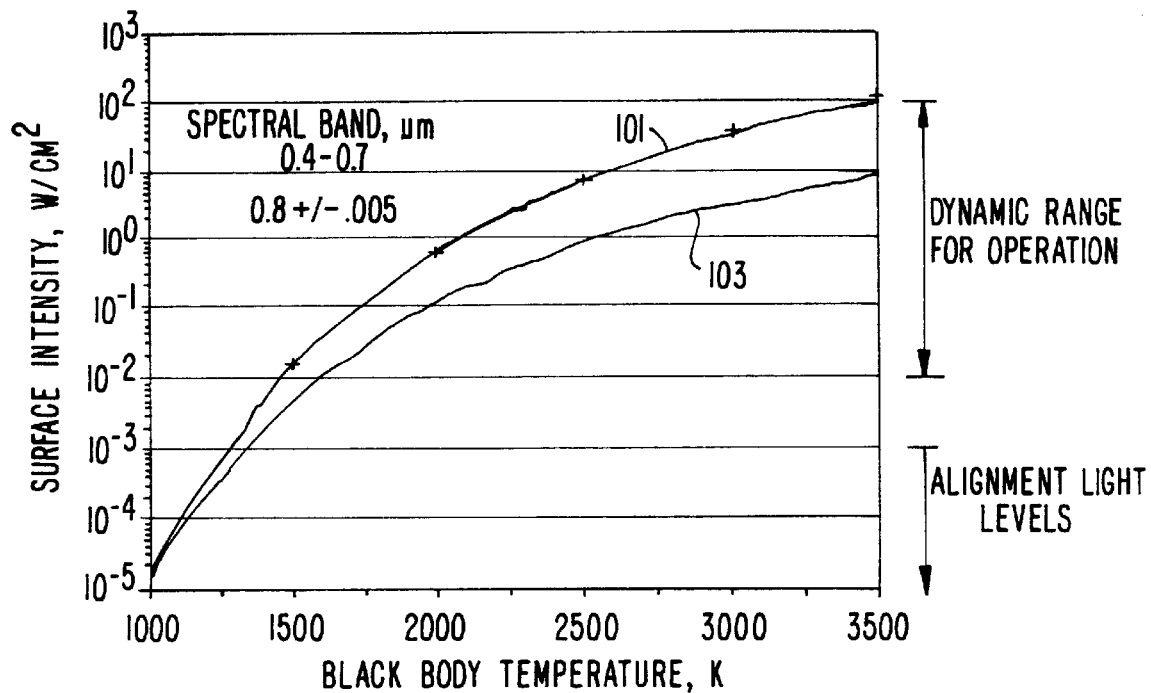
FIG. 1 illustrates the surface intensity of a black body as a function of temperature.

FIG. 1 illustrates the surface intensity of a black body as a function of temperature. Assuming that the surface temperature of the melt of interest varies between 1500 and 3500° K, the dynamic range required to view the entire melt surface must be in excess of $10^4$, or 80 dB. Although this range is easy to accommodate for the human eye, it exceeds the dynamic range of commercial CCDs by approximately a decade. Since the brightest object in view places an upper limitation on the usable range of the CCD, cooler objects outside the dynamic range of the CCD appear dark.

Besides the dynamic range limitations of the CCD, the display screen also has a very limited range. Typically, a good display screen provides a dynamic range of only 50 to 100. Therefore the dynamic range of the image captured by the CCD must be compressed (tone scale compression) into the narrower range of the display, thereby sacrificing photometric information. However for the purposes of a melt view camera, the CCD dynamic range presents a more limiting factor since it determines how much information is available for compression.

The advantages of using infrared light over visible light are apparent in FIG. 1. Curve 101 illustrates the surface intensity of a black body in the visible spectrum of 0.4 to 0.7 micrometers while curve 103 provides the same information at the infrared wavelength of 0.8 micrometers. As shown, the dynamic range in the infrared is reduced by approximately an order of magnitude, thus matching the dynamic range of many CCD cameras. Unfortunately, although the reduced dynamic range is an obvious benefit associated with operating the camera within the infrared, the additional burdens associated with optical alignment and camera focussing make infrared operation impractical for many applications.

FIG. 1 also illustrates the ambient visible intensity available for camera alignment. As shown, the difference between ambient intensity and the intensity emitted by a typical melt spans approximately 6 decades. Therefore in order to avoid saturating the detector, the intensity of the incident light must be reduced between the time the camera is aligned and when it is used to view the melt. A number of techniques may be used to reduce the incident intensity including mechanical apertures, filters, and electronic shutters.

Mechanical apertures are not a practical solution to reducing the light intensity for several reasons. First, the environment associated with many high temperature melt applications is a vacuum. However the operation of a mechanical aperture in a vacuum is often problematic. Second, for reasons described in more detail below, the diameter of the preferred camera aperture is on the order of 1 millimeter. If this aperture is reduced further in order to accommodate the reduced light intensity during alignment, diffraction effects will begin to limit the resolvable object size.

Although variable transmission filters may be used to reduce the light intensity during alignment, electronic shutters are typically easier to use. This is particularly true in light of the fact that many commercial CCD cameras include an electronic shutter in order to reduce the blur caused by moving objects. The electronic shutter simply reduces the charge integration time. In many cameras the integration time may be reduced to less than 1 microsecond.

Depending upon the selected camera, the available integration times, and the maximum melt temperature, an electronic shutter may not be able to be increased sufficiently to eliminate CCD saturation. In this case a neutral density filter may be used in conjunction with the electronic shutter to avoid CCD saturation. Preferably the selected neutral density filter is weak enough to permit ambient light alignment while strong enough to avoid blooming.

Space Constraints

Space constraints are one of the most restrictive requirements for a melt view camera. The selected location must provide an adequate view of the melt region of interest while not impacting the melt process. Once selected, the available space is largely occupied by thermal shielding and the water-cooled housing required by the electro-optics.

In the preferred embodiment of the invention, the selected location provides a wide field of view with a minimum aperture in the enclosure panel. In this embodiment, a wide field of view is preferable since it allows the entire crucible to be viewed. However, as a result of this location it is only possible to accommodate a miniature camera.

A number of miniaturized cameras are available that have the CCD and drive electronics separate from the camera control unit, thus allowing the camera control unit to be located outside the vacuum vessel. The biggest drawback to using miniaturized technology is that some technologies are not available in this form. For example, charge injection detectors (CID) which are completely resistant to thermal blooming are difficult, if not impossible, to miniaturize. Thus relying on miniaturized technology primarily limits this application to CCD cameras.

View Angle

Figure 2:
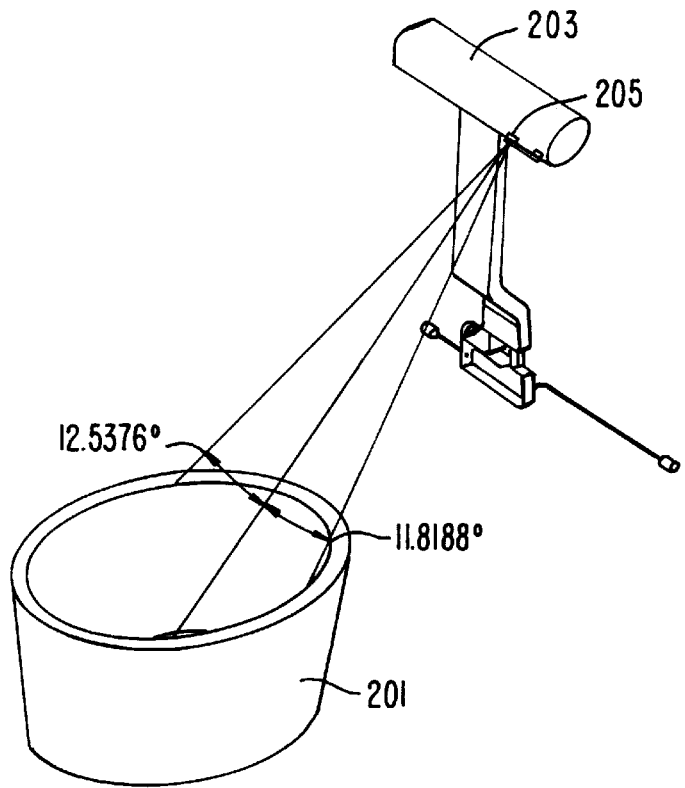
FIG. 2 illustrates the horizontal view angles required to intercept the crucible side walls for a specific embodiment of the invention.
Figure 3:
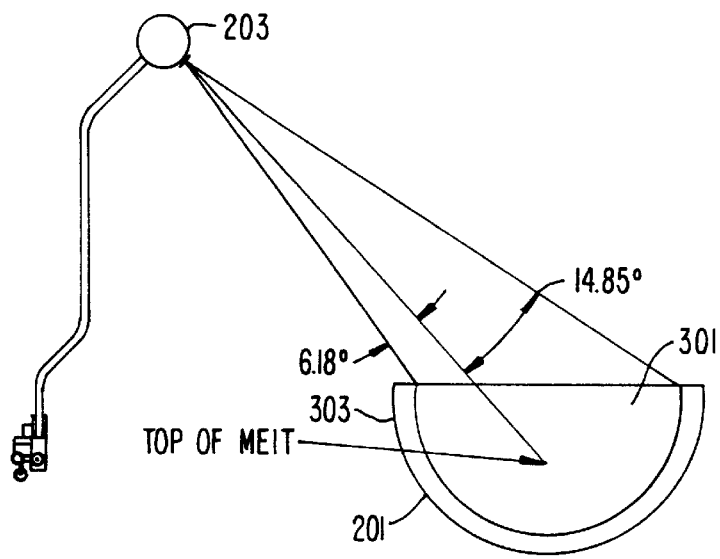
FIG. 3 illustrates the vertical view angles subtended by the end walls of the crucible shown in FIG. 2.

The crucible size and the distance to the camera determine the view angles as illustrated in FIGS. 2 and 3 for a representative crucible. FIG. 2 illustrates the horizontal view angles required to intercept the side walls of a crucible 201 using a camera 203. The horizontal half angle for this embodiment is approximately 12 degrees. In this embodiment, the viewing hole 205 is about an inch off of melt center, causing the angle to be slightly asymmetric. FIG. 3 shows that for this embodiment the vertical half angle is about 15 degrees. However, the bottom of melt 301 is clipped from view by end wall 303 of crucible 201. In order to view the clipped portion a camera must be mounted on the opposite side of the melt (not shown).

Figure 4:
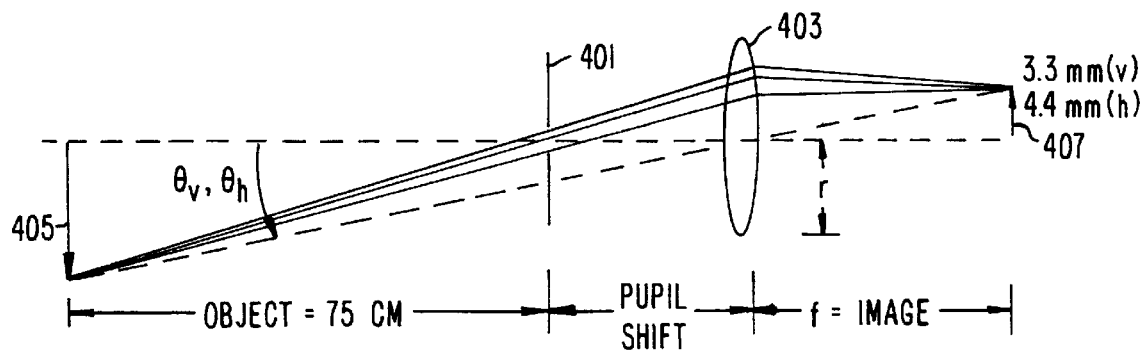
FIG. 4 illustrates the geometry of the optics associated with the melt camera.

FIG. 4 illustrates the geometry of the optics associated with the melt camera. As shown, the view angles and the CCD determine the lens focal length. Because the object is far from the lens compared to the image, the focal length, f, is approximately equal to the image distance. An entrance pupil 401 represents the pinhole that is shifted in front of a lens 403. Assuming a standard CCD, the horizontal and vertical resolution of a reference object is approximately equal when the CCD is used with a display tube. Since the vertical dimension is 75 percent of the horizontal dimension, the available vertical view angle is 25 percent less than the horizontal view angle.

The principal ray from the tip of an object 405 to the tip of an image 407 shows that the focal length, f, is related to the vertical view angle, $\theta_V$, by:

$$f \approx 3.3 \text{ mm/tan } \theta_V$$

The horizontal view angle, $\theta_H$, is given by:

$$\theta_H \approx \tan^{-1}(4.4 \text{ mm}/f)$$

The lens radius, r, which is fixed by the commercial products available with a specified focal length, determines how far the pinhole can be shifted before clipping the viewing angle. From geometry, the pupil shift must be less than $r/\tan \theta_V$ to avoid clipping.

Lens Design

To prevent the lens from limiting the spatial resolution, the image at the CCD must be near diffraction limited. In order to be able to align the system using visible light, the lens design must be chromatically corrected. The simplest arrangement that produces a diffraction limited image over the angle of interest was identified using a ray tracing code. The results for three different lens designs are shown in Table 1.

TABLE 1

|  | Ramsden Lens | Achromatic Doublet | Doublet Pair |
|---|---|---|---|
| Focal Length, mm | 18 | 18.7 | 19.8 |
| Object Resolution, mm | .52 | .51 | .51 |
| Diffraction Limit |  |  |  |
| 0° (calculated) | .52 | .51 | .51 |
| 10° (calculated) | 2.1 | 1.6 | .51 |

Although the modulation transfer function is technically the best figure of merit for comparing performance, the minimum resolvable object is of greater interest to the camera user. The resolution of a plano-convex pair was compared with that of a single achromatic doublet, and a pair of achromatic doublets. The net focal lengths provided in Table 1 are based on commercially available lenses. The object distance and entrance pupil used to obtain these results are consistent with the distance to the melt and the pinhole diameter for the preferred embodiment of the invention, as discussed previously.

On axis, the resolution is diffraction limited for all three lens designs. However, at 10° off-axis, chromatic aberrations are significant for the plano-convex pair, and barrel distortion is significant for the achromatic doublet. A doublet pair reduces the light bending angle at each surface by introducing more surfaces, and produces a diffraction limited view over ±10 degrees. These results were verified experimentally. Distortion becomes slightly noticeable with the doublet pair at 15° off-axis, which is the maximum angle required for this embodiment. Given these findings, the doublet pair is the preferable lens design for this configuration.

Table 2 shows the calculated view angle for various commercially available doublet pairs. The net focal length, f, is given by $1f \approx 1/f_1 + 1/f_2$ for a closely spaced pair. The view angles are calculated as described above.

TABLE 2

| Design Options | $f_1$, mm | $f_2$, mm | $f$, mm | $\theta_V$, degrees | $\theta_H$, degrees |
|---|---|---|---|---|---|
| Doublet Pair A | 38.1 | 38.1 | 20 | 9.0 | 12.0 |
| Doublet Pair B | 38.1 | 25.4 | 16 | 11.1 | 14.7 |
| Doublet Pair C | 25.4 | 25.4 | 14 | 13.1 | 17.2 |

Spatial Resolution

Provided the optics design is near diffraction limited, the optical line densities of the CCD and display screen are the limiting factors on optical resolution. To complement the acuity of the human eye, these technologies have developed in coordination with one another to produce equal horizontal and vertical resolution.

A CCD with 493 vertical pixels spread over 6.6 millimeters and 768 horizontal pixels spread over 8.8 millimeters has an optical line density of $$\frac{493 \text{ vertical pixels}}{2 \times 6.6 \text{ mm}} = 37 \text{ horizontal optical lines/mm}$$

$$\frac{768 \text{ horizontal pixels}}{2 \times 8.8 \text{ mm}} = 44 \text{ vertical optical lines/mm}$$

The factor of two in the denominator occurs because two pixels are required to produce an optically distinguishable feature.

For a display screen with 525 horizontal lines and 800 vertical lines, the equivalent optical line density, or resolving power, mapped onto the CCD is given by:

$$\frac{525 \text{ horizontal TV lines}}{2 \times 6.6 \text{ mm}} = 40 \text{ horizontal optical lines/mm}$$

$$\frac{800 \text{ vertical TV lines}}{2 \times 8.8 \text{ mm}} = 45 \text{ vertical optical lines/mm}$$

The display screen line density is mapped onto the CCD for a consistent comparison. The resolving powers of the CCD and display screen are symmetric in the horizontal and vertical, and similar to each other.

The diffraction limited angular resolution for a pinhole of diameter, d, and wavelength, $\lambda$, is given by:

$$\theta_r = 1.22 \frac{\lambda}{d}$$

The resolution of two points or lines is given by, $\Delta X = \theta_r f$. Defining the resolving power (RP) as $(\Delta X)^{-1}$, then $$RP = \frac{d}{1.22 \lambda f}$$

For a focal length of 18 millimeters, a wavelength of 570 nanometers, and a 1 millimeter pinhole, the diffraction limited spatial resolution is 80 optical lines per millimeter. This limit is negligible compared to contributions from the CCD or display screen. If the pinhole diameter is reduced another factor of two, diffraction becomes a limiting factor. This scaling has been verified in experimental tests with a pinhole camera.

Having identified the resolution limiting factors, a method of adding the limitations is needed. One commonly accepted approach is to assume the limitations add in a random fashion. Then the net resolving power, denoted as RP, is calculated as follows:

$$\frac{1}{RP^2} = \frac{1}{RP_{CCD}^2} + \frac{1}{RP_{TV}^2} + \frac{1}{RP_{diffraction}^2}$$

The net resolving power of the system is about 27 optical lines per millimeter in the horizontal and vertical. The effect of diffraction is negligible, whereas the contributions from the CCD and display are comparable.

For a given resolving power RP, the smallest resolvable object on the melt is given by the magnification divided by the RP. For the melt view camera, the magnification is about 18. Thus in this example the minimum resolvable object size on the melt is about 0.67 millimeters. Although this estimate is relatively crude and neglects subtle factors of the CCD and display screen electronics, based on experimental results it is valid to within 50 percent.

Depth of Field and Focus

FIG. 3 shows that the object distance varies in the vertical direction. The variation in object distance from the melt center to the top or bottom of the melt surface for this embodiment is about 30 centimeters. Therefore in order for everything to be in focus, the depth of field must exceed 30 centimeters.

The expression for depth of field is derived from geometry and given by:

$$\text{Depth of field} = \frac{2f^2 u^2 NC}{f^4 - (NCu)^2}$$

The focal length is f, the average object distance is u, N is equal to f/d where d is the pinhole diameter, and C is the circle of confusion at the focal point. For diffraction limited optics, the circle of confusion is determined by diffraction and is equal to $1/RP_{diffraction}$. For f equal to 18 millimeters, u equal to 75 centimeters, d equal to 1 millimeter, and N equal to 18, the depth of field is 50 centimeters. The large depth of field is due in large part to viewing the object through a small pinhole.

The depth of focus is also important because it determines the accuracy to which the camera must be fabricated. The expression for depth of focus is given by:

$$\text{Depth of focus} = \frac{2vNC}{f}$$

The image distance, v, is approximately equal to the focal length, f, yielding a depth of focus of 0.35 millimeters for this embodiment. The generous depth of focus, due primarily to the small pinhole, makes the fabrication tolerances quite tolerable.

Camera Enclosure and Support

Figure 5:
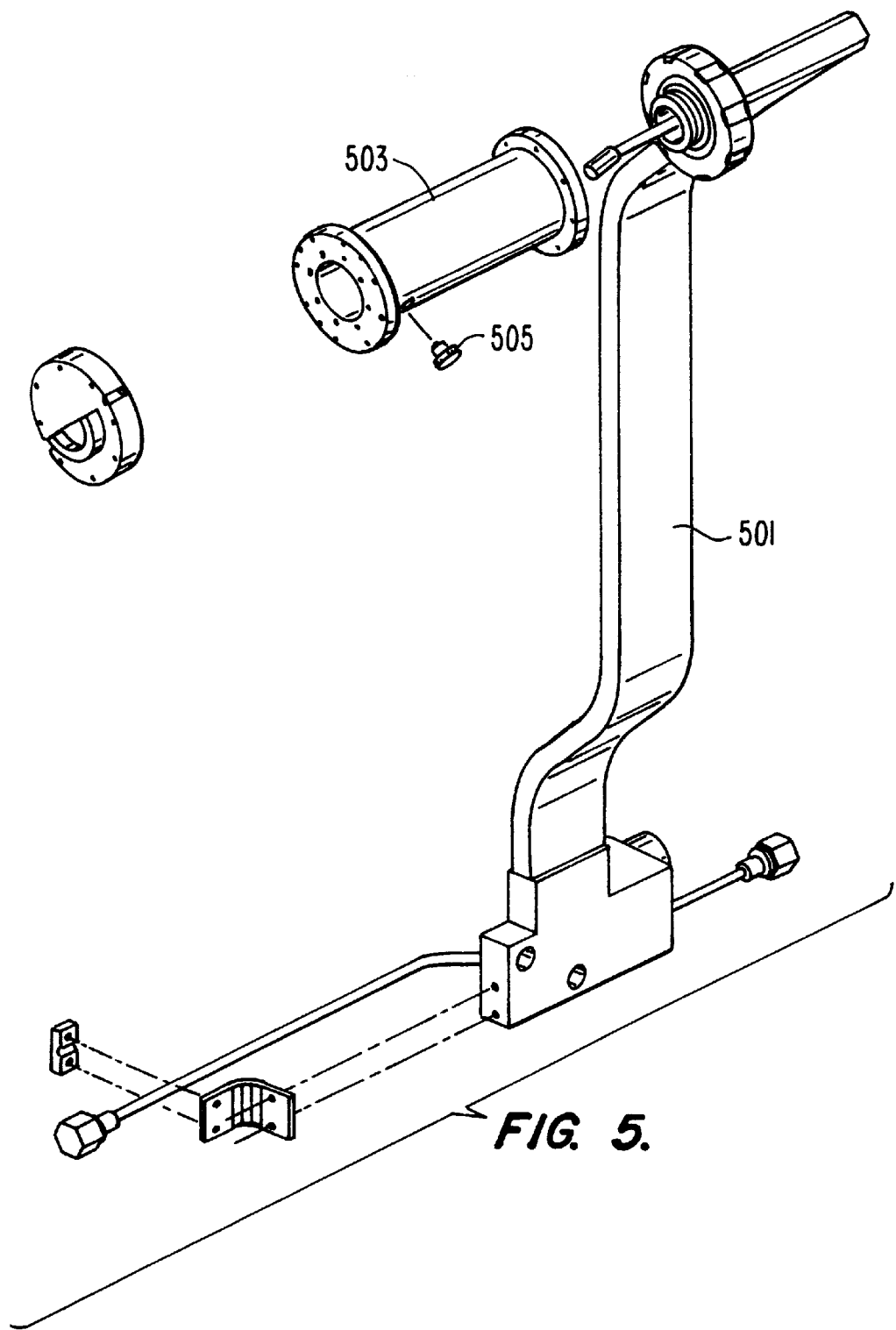
FIG. 5 is an exploded view of a melt view camera support and enclosure according to one embodiment of the invention.
Figure 6:
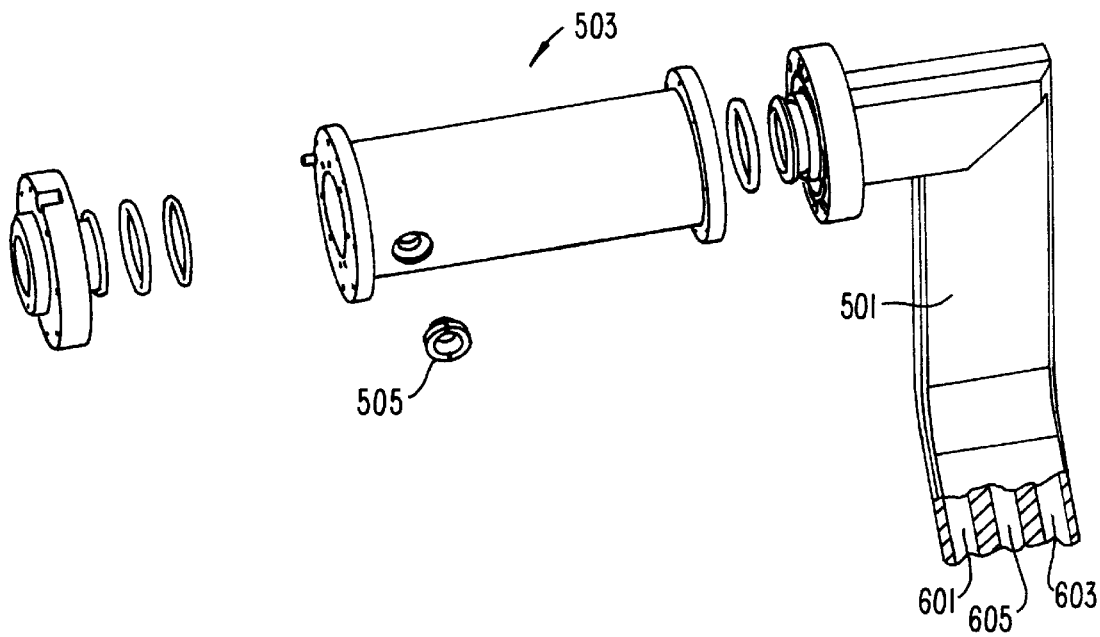
FIG. 6 provides further detail for the camera assembly shown in FIG. 5.

FIG. 5 is an exploded view of the melt view camera, including a support member 501 and a camera enclosure 503. FIG. 6 provides further detail for the camera enclosure 503. Camera support 501 locates the melt view camera enclosure 503 with respect to the melt as well as the crucible and the surrounding vessel. Included in enclosure 503 are water coolant lines 601 and 603 as well as a path 605 for routing the control wires and the scattering gas, preferably argon, from vacuum feed-throughs in the vessel to the CCD. Camera enclosure 503 bolts to support member 501. Within enclosure 503 is the electro-optics package that is maintained at nominal operating temperatures. The enclosure contains a replaceable pinhole 505 to protect the optics from condensation.

For the preferred embodiment of the invention, the design requirements for support 501 and enclosure 503 are:

Vacuum<$2 \times 10^{-6}$ Torr with a leak rate of less than $1 \times 10^{-8}$ cubic centimeters per second helium at $10^{-3}$ Torr Maximum heat flux on the outside surface of 4 watts per square centimeter Cooling loop ratings 165 maximum allowable working pressure Maximum water flow of 3 gallons per minute Maximum argon flow of 20 standard cubic centimeters per second Maximum temperature for the electronic and optical components of 50° C.

Figure 7:
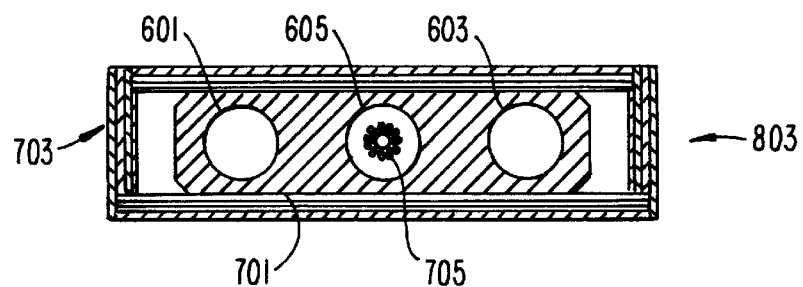
FIG. 7 illustrates a cross-section of the support conduit shown in FIG. 5.
Figure 8:
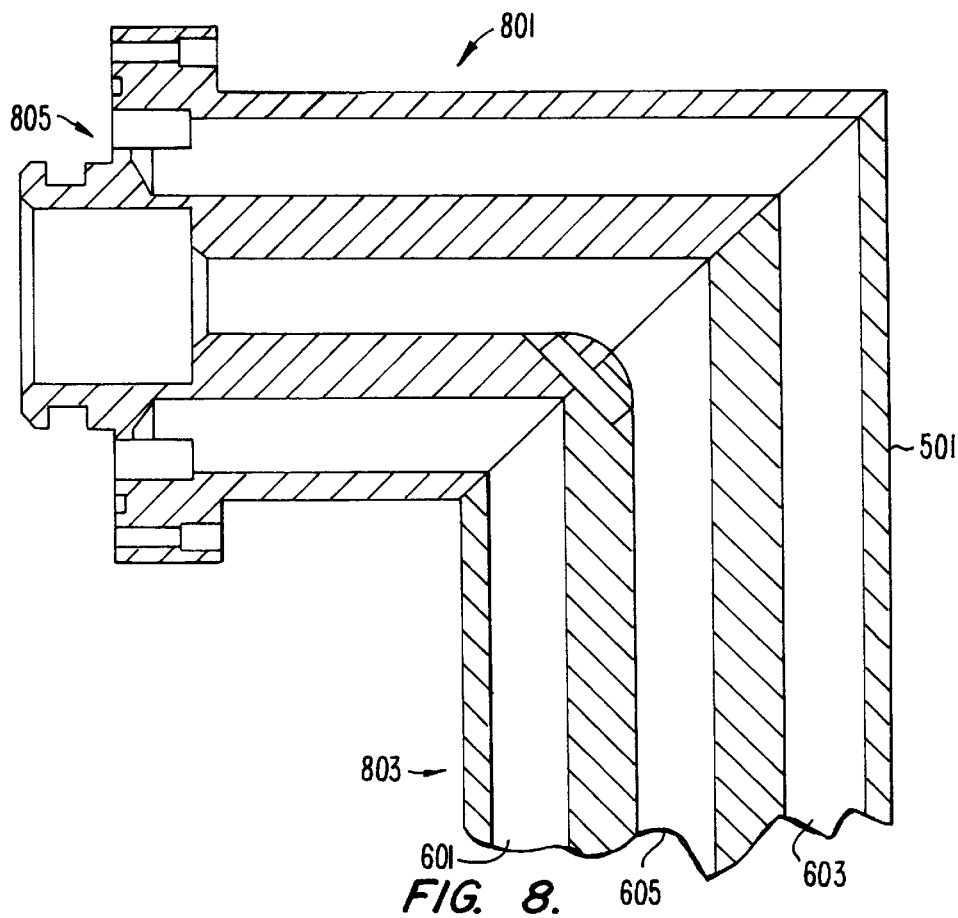
FIG. 8 illustrates a cross-section of the upper manifold section of the support conduit shown in FIG. 5.
Figure 9:
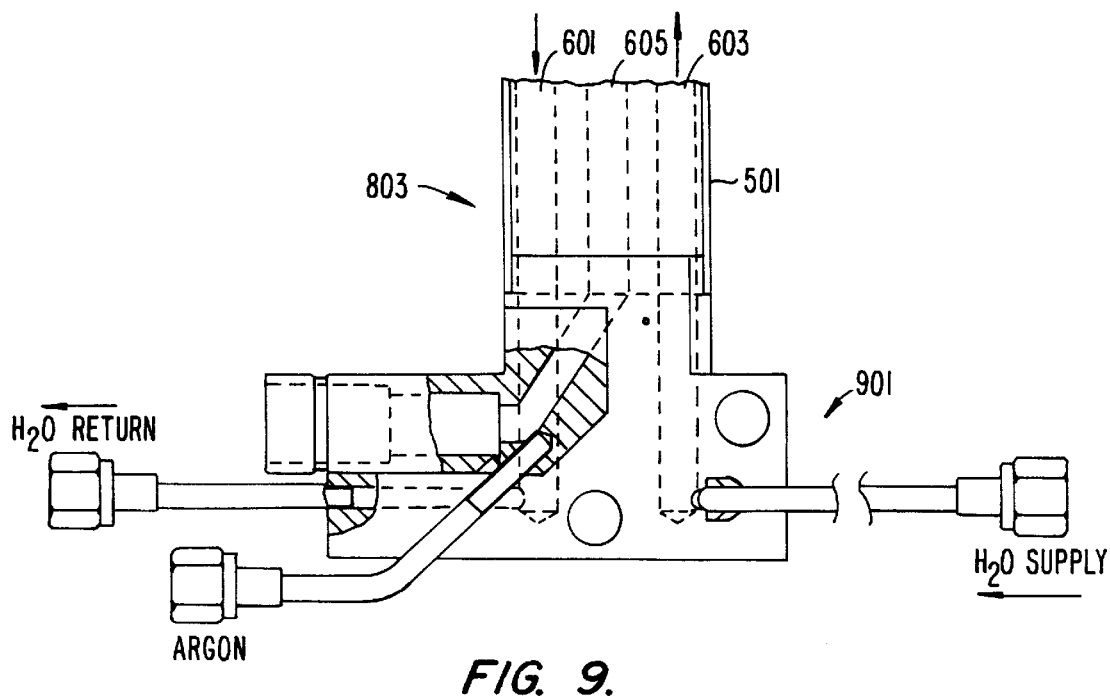
FIG. 9 illustrates a cross-section of the lower manifold section of the support conduit shown in FIG. 5.

FIGS. 7–9 are cross-sectional views of camera support 501. The illustrated support is a weldment of three parts; an upper manifold 801, a conduit portion 803, and a lower manifold 901.

FIG. 7 illustrates the cross-section of conduit portion 803. Conduit portion 803 includes an inner conduit 701 and an outer heat shield 703. Preferably inner conduit 701 is fabricated from a copper nickel composite, thus providing good thermal conductivity, hardness, and ease of machining. Typically the inner conduit is built from rectangular bar stock and three holes are gun drilled in the bar. Holes 601 and 603 provide the inlet and outlet passages, respectively, which are used for water coolant. Hole 605 provides a passage for purge gas as well as a signal cable 705. After drilling, the conduit section is bent to the required shape.

Upper manifold 801 is shown in FIG. 8. The upper manifold provides an interface 805 to the camera enclosure for the water coolant, purge gas, and electrical cable 705. The camera enclosure bolts to upper manifold 801 and continuous water passages are established using O-ring seals.

Lower manifold 901 contains the connectors and fittings needed for connecting the water cooling lines, the purge gas line, and the electrical cables to the vessel feed-throughs. Lower manifold 901 also contains holes for mounting the camera to a rigid structure.

Figure 10:
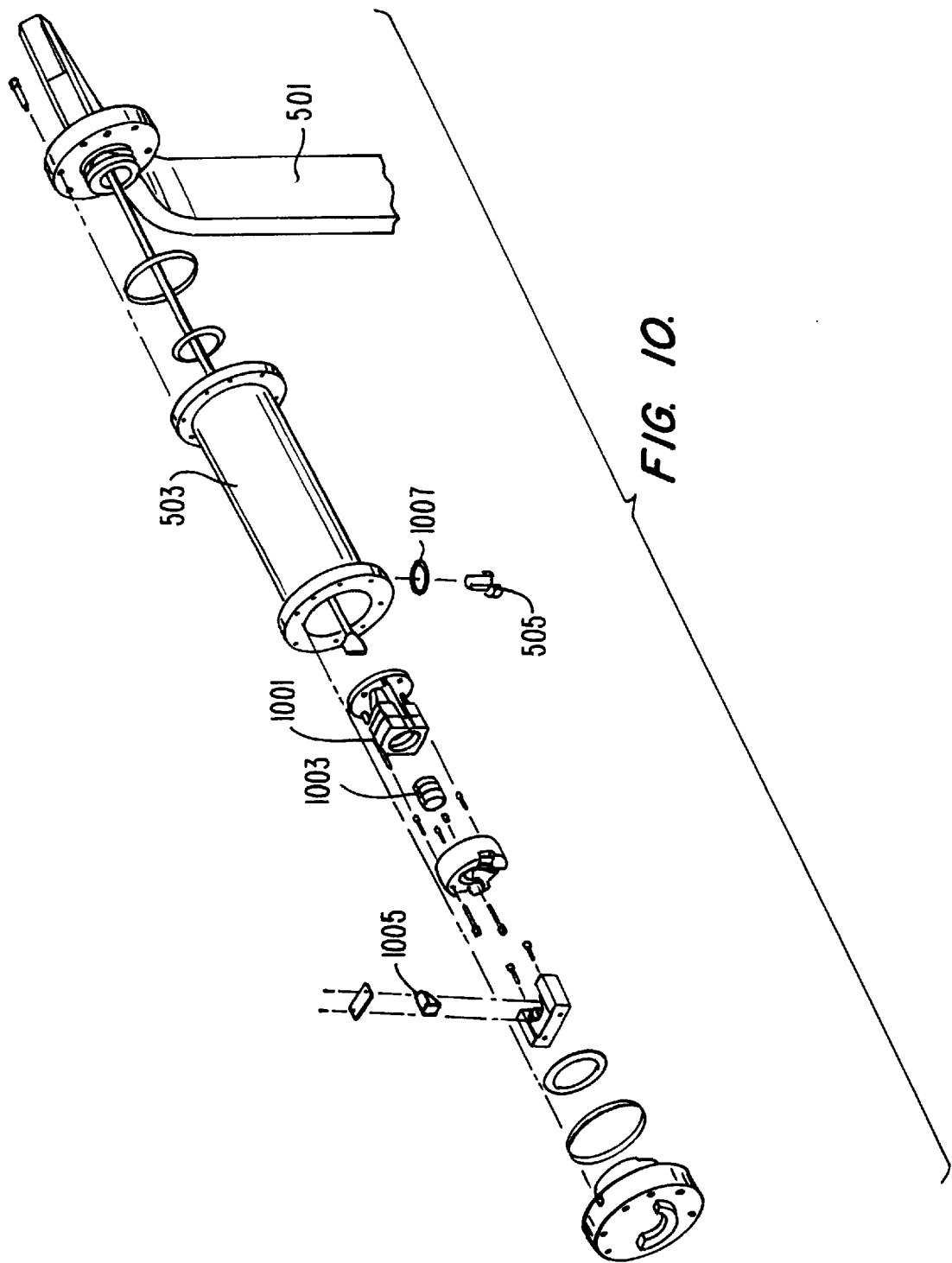
FIG. 10 is an exploded view of the camera enclosure shown in FIG. 5.

FIG. 10 is an exploded view of camera enclosure 503. The CCD camera 1001 is located within water cooled camera enclosure 503. CCD 1001 views the melt through a lens doublet 1003, a right angle turning mirror 1005, and pinhole 505. Pinhole 505 is machined into a cone shaped insert that threads into water cooled enclosure 503. A seal 1007 between pinhole 505 and enclosure 503 insures that the argon scattering gas is forced through pinhole 505 regardless of the path it takes within enclosure 503. The removable cone facilitates cleaning as well as pinhole replacement.

Thermal Analysis

In a typical configuration, the camera assembly resides inside the thermal enclosure surrounding the crucible. In the preferred embodiment of the invention, the average ambient temperature within this enclosure is 1000° C. To reduce the heat flux on the camera to manageable levels, the support structure and camera enclosure are wrapped in four layers of heat shield 703. Heat shield 703 reduces the incident flux to less that 1 watt per square centimeter, a flux easily accommodated by the use of a water coolant as indicated above.

In the preferred embodiment, portions of camera support structure 501 are less than a few centimeters from heater elements radiating as much as 90 watts per linear inch. A finite element analysis was conducted in this area to determine if four layers of heat shield 703 are adequate to prevent boiling of the cooling water or damage to electrical cables 705. Analysis was also conducted to determine the temperature rise of the CCD due to the 4 watts dissipated in its electrical components. The results of this analysis are summarized below:

Maximum temperature of camera support 501 at the heater region is 12° C. above the water temperature The temperature inside camera enclosure 503 does not exceed 3° C. above the water temperature assuming a 2 gallons per minute water flow The maximum pressure drop at 2 gallons per minute water flow is 41 pounds per square inch The effect of argon flow on heat transfer at the CCD is negligible As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention as set forth in the following claims.

What is claimed is:

1. A melt view camera, comprising:
   a water cooled camera enclosure coupled to a vacuum enclosure containing a melt;
   a CCD detector array contained within said camera enclosure;
   an electronic shutter coupled to said CCD array;
   an optical train for imaging said melt onto said CCD array, said optical train contained within said camera enclosure;
   a ninety degree turning element within said optical train;
   a pinhole in said camera enclosure, wherein said image of said melt passes through said pinhole, and wherein a gas passes through said pinhole;
   a camera mounting member coupled to said camera enclosure, wherein said mounting member includes at least two water passages, wherein water for said water cooled camera enclosure passes through said water passages, and wherein said mounting member includes a gas passage, said gas passing through said gas passage prior to passing through said pinhole; and
   an electrical cable, said electrical cable coupling said CCD array to a camera control unit, wherein said electrical cable passes through said gas passage.

2. The melt view camera of claim 1, wherein said optical train is further comprised of a doublet pair.

3. The melt view camera of claim 2, wherein said doublet pair is chromatically corrected.

4. The melt view camera of claim 1, wherein said pinhole has a 1 millimeter diameter.

5. The melt view camera of claim 1, wherein said pinhole is threadably coupled to said camera enclosure.

6. The melt view camera of claim 1, wherein said camera mounting member further comprises a conduit member, wherein said water passages and said gas passage pass through said conduit member.

7. The melt view camera of claim 6, wherein said conduit member is comprised of a copper nickel composite.

8. The melt view camera of claim 1, wherein said camera mounting member and said camera enclosure further comprises outer radiation shielding.

9. The melt view camera of claim 8, said radiation shielding comprised of a multi-layered structure.

10. The melt view camera of claim 9, wherein said multi-layered structure is comprised of niobium.

11. The melt view camera of claim 1, wherein said optical train is further comprised of a neutral density filter.

12. The melt view camera of claim 1, wherein said electronic shutter has a variable shutter speed in the range of about $1/63$ seconds to $2.7 \times 10^{-7}$ seconds.

13. The melt view camera of claim 1, wherein said optical train produces a near diffraction limited image of said melt on said CCD array over a range of $\pm 10$ degrees off-axis.

14. The melt view camera of claim 1, wherein said gas is an inert gas.

15. The melt view camera of claim 14, wherein said inert gas is argon.

16. The melt view camera of claim 1, wherein said image of said melt is a visible wavelength image.

17. The melt view camera of claim 1, wherein said optical train and said CCD detector array are alignable using ambient, visible wavelength light.

18. A melt view camera, comprising:
   a water cooled camera enclosure coupled to a vacuum enclosure;
   a CCD detector array contained within said camera enclosure containing a melt;
   an electronic shutter coupled to said CCD array, wherein said electronic shutter reduces a charge integration time for said CCD array to less than 1 microsecond;
   an optical train for imaging said melt onto said CCD array, said optical train contained within said camera enclosure, wherein said optical train produces a substantially diffraction limited image of said melt on said CCD array over a range of at least $\pm 10$ degrees off-axis;
   a pinhole in said camera enclosure, wherein said image of said melt passes through said pinhole, and wherein said pinhole has a diameter of less than 1.5 millimeters;
   a camera mounting member coupled to said camera enclosure, wherein said mounting member includes at least two water passages, wherein water for said water cooled camera enclosure passes through said water passages, and wherein said mounting member includes a gas passage, wherein a gas passes through said gas passage prior to passing through said pinhole; and
   an electrical cable, said electrical cable coupling said CCD array to a camera control unit, wherein said electrical cable passes through said gas passage.

* * * * *